United States Patent [19]

Saito

[11] Patent Number: 4,590,532
[45] Date of Patent: May 20, 1986

[54] MAGNETIC DISK ASSEMBLY CARTRIDGE FOR SAME AND RECORDING/REPRODUCING APPARATUS FOR USE WITH SAME

[75] Inventor: Etsuro Saito, Ayase, Japan

[73] Assignee: Sony Corporation, Tokyo, Japan

[21] Appl. No.: 689,515

[22] Filed: Jan. 9, 1985

Related U.S. Application Data

[63] Continuation of Ser. No. 383,208, May 28, 1982, abandoned.

[30] Foreign Application Priority Data

Jun. 5, 1981 [JP] Japan .................... 56-82831[U]

[51] Int. Cl.⁴ .................... G11B 23/03; G11B 5/012; G11B 5/016; G11B 3/70
[52] U.S. Cl. .................... 360/133; 360/97; 360/99; 346/137; 369/282
[58] Field of Search .................... 360/133, 137, 97, 99, 360/135, 86; 346/137; 369/282, 290

[56] References Cited

U.S. PATENT DOCUMENTS

| | | | |
|---|---|---|---|
| 1,417,339 | 5/1922 | Lenton | 369/282 |
| 1,821,916 | 9/1931 | Acheson | 369/282 |
| 1,824,253 | 9/1931 | Acheson | 369/282 |
| 1,846,378 | 2/1932 | Acheson | 369/282 |
| 2,661,815 | 12/1953 | McGay et al. | 346/137 |
| 3,682,487 | 8/1972 | Eriksson | 369/282 |
| 4,060,839 | 11/1977 | Meadows | 360/135 |
| 4,091,454 | 5/1978 | Kauffmann | 360/97 |
| 4,149,207 | 4/1979 | Porter | 360/133 |
| 4,441,178 | 4/1984 | Kobayashi et al. | 346/137 |
| 4,445,155 | 4/1984 | Takahashi et al. | 346/137 |
| 4,459,628 | 7/1984 | Barton | 360/133 |
| 4,466,032 | 8/1984 | Saito | 360/99 |

OTHER PUBLICATIONS

IBM Technical Disclosure Bulletin, vol. 13, No. 5, Oct., 1970, p. 1242–"Disk Pack Locating Device"–A. Kluth.

Primary Examiner—A. J. Heinz
Assistant Examiner—Alfonso Garcia
Attorney, Agent, or Firm—Lewis H. Eslinger; Alvin Sinderbrand

[57] ABSTRACT

A magnetic disk assembly is comprised of a magnetic disk and a hub member centrally positioned on that disk and having a non-circular opening for receiving a circular drive shaft which serves to rotatably drive the magnetic disk. The hub member includes at least two reference surfaces which converge toward each other and which form two respective walls of the opening, and one or more resilient members having a surface which forms a third wall of the opening. The three walls are positioned and dimensioned such that when a circular drive shaft is received, the reference surfaces and the surface of the resilient member all tangentially contact the drive shaft to be rotated thereby when the drive shaft rotates.

21 Claims, 5 Drawing Figures

MAGNETIC DISK ASSEMBLY CARTRIDGE FOR SAME AND RECORDING/REPRODUCING APPARATUS FOR USE WITH SAME

This is a continuation of application Ser. No. 06/383,208, filed May 28, 1982 now abandoned.

BACKGROUND OF INVENTION

This invention relates to a magnetic disk assembly and, more particularly, to such an assembly wherein the magnetic disk is provided with a hub member having a non-circular opening which functions to center the magnetic disk on a drive shaft. The invention also relates to a magnetic disk cartridge which contains the magnetic disk assembly and, additionally, to apparatus which uses the magnetic disk cartridge to record and/or reproduce signals on the magnetic disk.

Magnetic disk cartridges are known wherein a magnetic disk assembly is housed within a jacket which serves to protect the magnetic disk from crumpling, folding or other damage, particularly when the magnetic disk cartridge is not in use or when that cartridge is shipped. One type of magnetic disc which is housed within such a jacket is the so-called "floppy" disk or diskette. To permit a magnetic transducer to gain access to the disk and thus record or reproduce signals thereon, the jacket is provided with a window through which the transducer is inserted into magnetic contact with the surface of the magnetic disk. Also, the jacket is provided with a generally central aperture through which a disk drive shaft may be inserted into driving engagement with the center hub of the magnetic disk so as to rotate the disk when the shaft is driven.

In order to permit satisfactory rotation of the magnetic disk within the jacket, it may be desirable to provide sufficient play of the disk hub relative to to the drive shaft opening in the jacket. However, such play, which generally permits lateral movement of the magnetic disk within the jacket, may affect the proper positioning of the magnetic disk when the jacket is loaded into record/reproducing apparatus. More particularly, when such a jacket is loaded into record/reproducing apparatus, the aforementioned lateral movement of the magnetic disk due to the play of the disk hub relative to the jacket opening may result in mis-positioning of the disk such that the magnetic transducer is off-set from the desired relative position thereof on the disk. Hence, if a particular track has been recorded on the magnetic disk by a transducer during a previous recording operation, the play of the magnetic disk within the jacket may mis-position the transducer when the jacket subsequently is loaded into the same or different record/reproducing apparatus for a subsequent playback operation. This mis-position of the transducer may result in a mis-alignment thereof relative to the desired track.

Another difficulty which may arise due to the play of the magnetic disk relative the jacket is that when the jacket is loaded into record/reproducing apparatus, the center of the disk might not be coincident with the axis of the drive shaft that is inserted into the disk hub. Such non-coincidence may result in eccentric rotation of the disk by the shaft.

In order to provide proper centering of the magnetic disk housed within a jacket when the jacket is loaded into record/reproducing apparatus, it has been proposed to form the hub with a non-circular opening for receiving the drive shaft of the record/reproducing apparatus. One example of a magnetic disk assembly having a hub with a non-circular opening is described in U.S. Pat. No. 4,149,207. The non-circular opening described in this patent includes two straight edges which form an angle with each other on the order of about 60 degrees. When a drive shaft is inserted into the non-circular opening, both of these straight edges are brought into tangential contact with the drive shaft and thereby bring the center of the disk into coincidence with the axis of the shaft. However, the minimum diameter of this non-circular opening is greater than the diameter of the drive shaft. Hence, although the straight edges of this opening are in tangential contact with the drive shaft, the shaft is free to rotate within the opening without also rotating the hub and magnetic disk. Rather, to effect rotation of the disk, an additional pin on the drive mechanism is inserted into a separate aperture on the disk, and the pin is driven to rotate with the drive shaft, thereby exerting a rotary force on the aperture into which it is inserted and, thus, resulting in rotation of the disk. Thus, according to this patent, the angled straight edges of the non-circular opening in the disk serve to center the disk on the drive shaft, but a separate rotary pin is needed in order to rotatably drive the disk. The drive shaft is not capable of both centering the disk thereon as well as driving it.

The disk drive described in the aforementioned patent is not satisfactory for use with a magnetic disk having a relatively small diameter. For example, if the magnetic disk exhibits a diameter on the order of 50 mm, such a small dimension does not permit additional room on the disk for a separate aperture into which a drive pin may be inserted for rotating the disk. Rather, it is important that the drive shaft perform the functions of centering the disk thereon and rotatably driving it.

OBJECT OF THE INVENTION

Therefore, it is an object of the present invention to provide on improved magnetic disk assembly having a center hub member which is provided with a non-circular opening to receive a circular drive shaft and to carry out the two functions of centering the disk on that shaft as well as engaging the shaft so as to rotatably drive the disk.

Another object of this invention is to provide an improved magnetic disk assembly of the aforementioned type wherein the non-circular opening of the hub member exhibits an internal diameter which is less than the diameter of the drive shaft which is inserted therein and, thus, grips that drive shaft so as to be rotated thereby.

A further object of this invention is to provide a magnetic disk assembly of the aforementioned type wherein the non-circular center opening is provided with two converging reference surfaces and a resilient member all of which tangentially contact the drive shaft inserted into the opening so as to center the disk on the drive shaft and also rotate the disk when the shaft rotates.

An additional object of this invention is to provide a magnetic disk cartridge which includes the magnetic disk assembly as aforementioned, and also a jacket for containing the magnetic disk assembly therein, the jacket being provided with an aperture through which the hub member may be accessed by a drive shaft.

A still further object of this invention is to provide apparatus for recording and/or reproducing signals on the disk of the magnetic disk assembly of the aforementioned type.

Another object of this invention is to provied an improved magnetic disk assembly which overcomes the disadvantages and defects attending known magnetic disk assemblies described hereinabove.

Various other objects, advantages and features of the present invention will become readily apparent from the ensuing detailed desction, and the novel features will be particularly pointed out in the appended claims.

SUMMARY OF THE INVENTION

In accordance with this invention, a magnetic disk assembly is provided with a magnetic disk and a hub member centrally positioned on the magnetic disk. The hub member has a non-circular opening for receiving a circular drive shaft which serves to rotatably drive the magnetic disk. The hub member includes at least two converging reference surfaces which form two respective walls of the opening, and at least one resilient member having a surface which forms a third wall of the opening. The three walls are positioned and dimensioned such that when a circular drive shaft is received, the reference surfaces and the surface of the resilient member all tangentially contact the drive shaft to be rotated thereby when the drive shaft rotates.

In accordance with one aspect of this invention, the two reference surfaces are equally radially distant from the center of the magnetic disk, and the resilient member urges the drive shaft, when the latter is received, into tangential contact with the two reference surfaces. In this manner, the reference surfaces serve to center the disk on the drive shaft such that the center of the disk is coincident with the axis of the shaft.

In one embodiment of this invention, the aforementioned resilient member is a chordal element that is interposed between the non-circular opening of the hub member and an elongated hole, the latter being substantialy parallel to the chordal element. When a drive shaft is received in the opening, the chordal element flexes away from the reference surfaces so as to urge such reference surfaces into firm contact with the drive shaft. In this embodiment, the hub member also has a pair of walls each of which extends between one of the reference surfaces and a respective end of the chordal element.

In accordance with another embodiment of this invention, the aforementioned resilient member is formed of a pair of flexible legs or fingers which extend toward each other and are separated by a gap. When a drive shaft is inserted into the non-circular opening, each of the flexible legs or fingers contacts the drive shaft to urge the center of the disk into coincidence with the axis of the shaft. In this embodiment, the non-circular opening is substantially trapezoidal in shape, and the flexible legs or fingers form the base of the trapezoid.

In accordance with another aspect of this invention, the magnetic disk cartridge described above is used in recording/reproducing apparatus, such apparatus being provided with the aforementioned drive shaft and also with a magnetic transducer that is positionable through a window of the jacket into magnetic contact with the magnetic disk so as to record or reproduce signals thereon.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
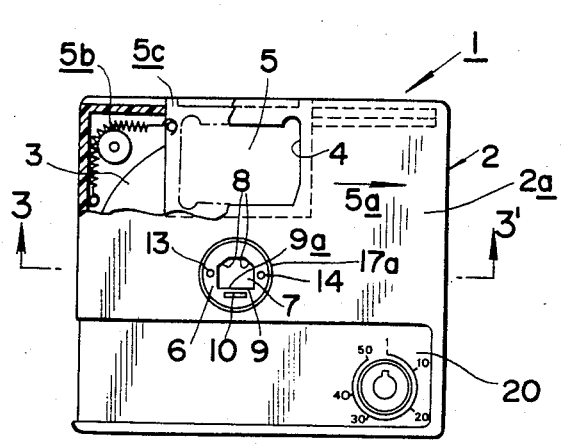
FIG. 1 is a top plan view of a jacket or cartridge containing a flexible magnetic disk, which is shown partly broken away.
Figure 2:
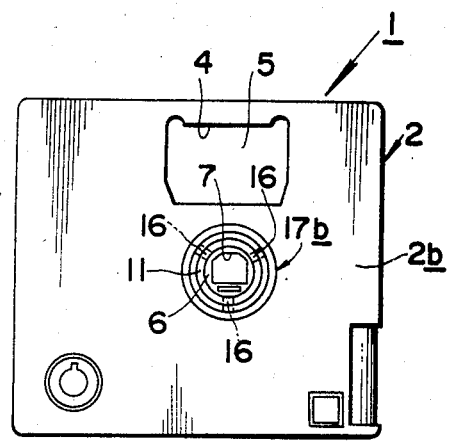
FIG. 2 is a bottom plan view of the jacket or cartridge shown in FIG. 1.
Figure 3:
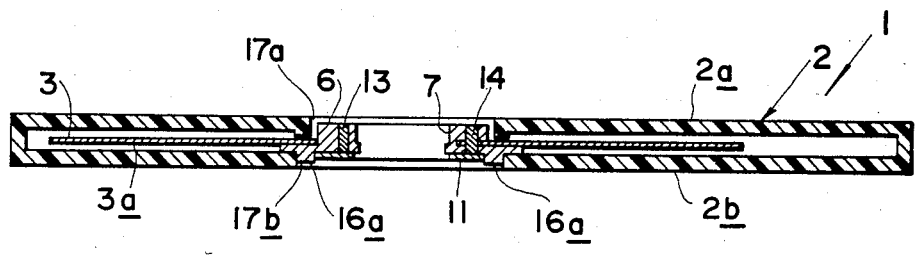
FIG. 3 is an enlarged sectional view taken along the line 3—3' in FIG. 1.

Referring now to the drawings, wherein like reference members are used, and initially to FIGS. 1, 2 and 3, it will be seen that a cartridge 1 intended for use in a flexible disk recording and/or reproducing apparatus comprises a substantially flat rectangular jacket or housing 2 which may be molded of a suitable plastic and has opposed walls 2a and 2b between which a flexible disk 3 of magnetic material is freely rotatable. Disk 3 is of a suitably small diameter, for example, no more than about 50 mm, so that jacket 2 can be of correspondingly small size, for example, measuring 60 mm by 54 mm by 3 mm, for convenience of handling, storage and shipping, as by mail, and for use in a very compact recording and/or reproducing apparatus which may, for example, be part of a still picture camera which is not substantially larger than a conventional 35 mm single-lens reflex camera. Opposed walls 2a and 2b of jacket 2 have aligned openings or windows 4 therein which extend, in the radial direction of disk 3, at least to the inner and outer effective limits of circular recording tracks on a recording surface 3a on the disk. A door member 5 straddles disk 3 and is slidable along an edge portion of jacket 2 with portions of door member 5 disposed against the inner surfaces of walls 2a and 2b for slidable mevement in the direction of the arrow 5a on FIG. 1 from the illustrated closed position to an open position in which door member 5 clears windows 4. A tension spring 5b may be connected to door member 5 for urging the latter to its closed position, and projection 5c extends from door member 5 and may be acted upon by a suitable member provided on the apparatus which receive cartridge 1 in the camera (not shown) for opening door member 5 upon the insertion of cartridge 1 into the recording and/or reproducing apparatus. When door member 5 is thus opened, one or more magnetic heads can extend through one of the windows 4 for magnetically recording information signals for example, recording a still image or picture, in a selected one of concentric circular record tracks on surface 3a (FIG. 3) of the disk.

A hub 6 is provided at the center of disk 3 and has a hole 7 extending therethrough for receiving a drive shaft (not shown) of the recording and/or reproducing apparatus. The hole 7 is non-circular so as to define a pair of relatively angled positioning surfaces 8 adapted to tangentially engage the circular periphery of the drive shaft for centering rotary disk 3 relative to the axis of the drive shaft. A resilient chordal element 9 extends across hole 7 at the side of the latter opposite positioning surfaces 8. Such chordal element 9 is backed up on an elongated hole 10 extending along element 9 at the side of the latter opposite that surface 9a thereof which a foces toward positioning surfaces 8. The described hub 6 can be easily molded of suitable plastic material which further lends elasticity to the resilient element 9. The hole 7 is dimensioned so that, when the drive shaft is inserted therein, resilient element 9 is flexed away from positioning surfaces 8 by the shaft, whereby to maintain firm contact of surfaces 8 with the outer periphery of the drive shaft.

Hub 6 is further shown to have an annular magnetic member 11 suitably mounted on its lower surface. A magnetic detecting pin 13 for use in detecting the rotational phase or position of disk 3, and a non-magnetic balancing pin 14 of substantially the same weight as pin 13 are embedded in hub 6 at diametrically opposed locations. In one embodiment, at least three supports or feet 16 extend from the lower surface of hub 6 at equally angularly spaced apart locations which are radially outward in respect to annular magnetic member 11. The bottom surfaces 16a of supports 16 project slightly from the underside of hub 6 and define a reference level with respect to the magnetic recording surface 3a of disk 3. In another embodiment, feet 16 are replaceed by a continuous annular rim. Walls 2a and 2b of jacket 2 have central openings 17a and 17b in which hub 6 is loosely rotatable.

As mentioned above, and as best shown in FIG. 4, non-circular opening 7 of hub 6 is provided with two reference surfaces 8 which converge toward each other and which form two respective walls of opening 7. Although these surfaces or walls converge toward each other, it is seen that the converging surfaces or walls do not intersect. The angle formed by the surfaces or walls is not critical; it merely is sufficient that such surfaces tangentially contact a drive shaft of the record/reproducing apparatus when cartridge 1 is loaded into such apparatus. An example of suitable record/reproducing apparatus which may be used with cartridge 1 is described in, for example, copending application Ser. No. 06/335,347, now U.S. Pat. No. 4,466,032; Surfaces or walls 8 are equally radially distant from the center of the magnetic disk 3. That is, the shortest radius lines from the center of the disk to each of surfaces or walls 8 will be equal.

Figure 4:
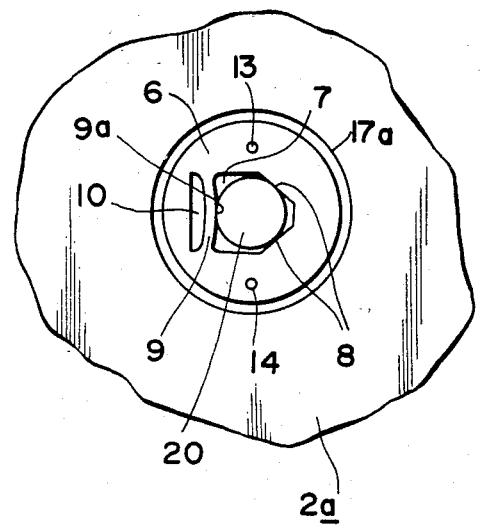
FIG. 4 is an enlarged fragmentary top plan view of the cartridge and disk shown in FIG. 1.

FIG. 4 also illustrates resilient chordal element 9 as a generally elongated member that is interposed between non-circular opening 7 and generally elongated hole 10, the latter being substantially parallel to the member 9. Surface 9a of element 9 forms a third wall of non-circular opening 7. In the embodiment of FIG. 4, the hub is formed of a suitable plastic material and is of unitary construction. Flexible element 9 is seen to be spaced from surfaces or walls 8 by a fourth wall extending from one of the surfaces or walls 8 to one end of element 9 and by a fifth wall extending from the other surface or wall 8 to the other end of element 9.

When cartridge 1 is loaded into suitable record/reproducing apparatus, such as that described in the above mentioned copending application, a circular drive shaft 20 provided in that apparatus is inserted into non-circular opening 7 of hub 6. The radius of drive shaft 20 exceeds the radial distance from the center of the disk 3 to each of surfaces or walls 8 and to surface 9a of resilient element 9. Consequently, when the drive shaft is inserted, as shown in FIG. 4, resilient element 9 flexes away from surfaces or walls 8. Hence, the surfaces or walls 8 as well as surface 9a are in tangential contact with drive shaft 20; and a resilient bias force urges the drive shaft into firm contact with such surfaces. More accurately, since drive shaft 20 generally is fixed in the record/reproducing apparatus and restrained from lateral movement, the resilient bias force exerted by resilient element 9 urges surfaces or walls 8 into firm contact with the drive shaft. The contact between surfaces or walls 8, surface 9a and drive shaft 20 is sufficient such that when the drive shaft is rotatably driven, hub 6 is rotated thereby so as to correspondingly rotate disk 3.

From FIG. 4, it will be recognized that the angle formed between surfaces or walls 8, although not critical, is such that lines drawn from the axis of drive shaft 20 to the tangential contact points on each of surfaces or walls 8 will be normal to such tangential contact points and intersect at the center of magnetic disk 3. Thus, surfaces or walls 8 serve as reference surfaces which, in cooperation with resilient element 9, serve to bring the center of disk 3 into coincidence with the axis of drive shaft 20.

Preferably, the top or free end of drive shaft 20 is conically shaped so that the drive shaft may be easily inserted or guided into non-circular opening 7 along the conical surfaces thereof.

Since resilient element 9 is integrally formed as a portion of hub 5, the particular plastic material of which the hub and the resilient element are formed may be suitably selected so as to provide the desirable elasticity or resilience to element 9.

Figure 5:
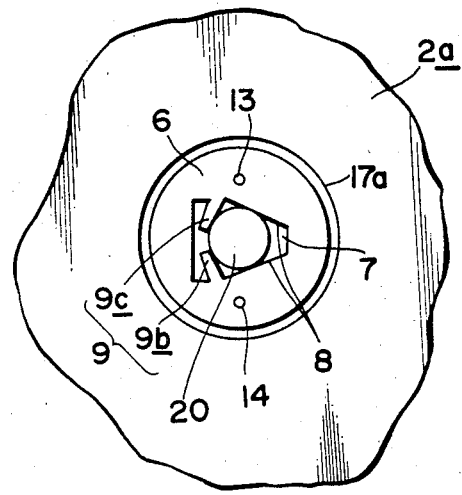
FIG. 5 is a plan view of another embodiment of the cartridge and disk.

An alternative embodiment of hub 6 is illustrated in FIG. 5. In this alternative embodiment, the single elongated resilient chordal element 9 is replaced by a pair of legs or fingers 9b and 9c which extend toward each other and which are separated by a gap. The legs or fingers are integrally formed with the hub 6 and, thus, are resilient.

Normally, when drive shaft 20 is not received by non-circular opening 7, the surfaces of flexible legs or fingers 9b and 9c are substantially coplanar and, with the gap therebetween, form the third wall of non-circular opening 7 similar to the third wall formed by the surface 9a of chordal element 9 in FIG. 4. However, when drive shaft 20 is inserted into the non-circular opening of FIG. 5 legs or fingers 9b and 9c flex in a direction away from surfaces or walls 8, as shown. Hence, the surface of each leg or finger 9b and 9c which faces the non-circular opening is in tangential contact with drive shaft 20.

The geometrical shape of non-circular opening 7 differs in the embodiment of FIG. 5 from that shown in FIG. 4. In the absence of drive shaft 20, the non-circular opening of the embodiment shown in FIG. 5 exhibits a substantially trapezoidal shape with legs or fingers 9b and 9c forming the base of the trapezoid and reference surfaces or walls 8 forming the angled sides thereof. In the foregoing embodiments, at least three separated surfaces or walls of hub 6 are in tangential contact with drive shaft 20 when the latter is inserted thereinto. This establishes a fixed relationship between reference surfaces or walls 8 and the periphery of the drive shaft so as to make the center of disk 3 coaxial with the axis of drive shaft 20. Furthermore, the resilient urging of resilient element 9 (of either embodiment shown in FIG. 4 or FIG. 5) results in firm contact between at least three walls or surfaces of hub 6 and the drive shaft such that when the drive shaft rotates the hub and, thus, the magnetic disk, also rotate therewith.

If desired, an additional number of surfaces of walls of hub 6 may be in tangential contact with drive shaft 20. FIG. 5 illustrates four surfaces in contact with the drive shaft, and a greater number of surfaces may be used if desired.

Returning to FIG. 1, cartridge 1 is provided with an indicator 20, for example, which includes a rotatable dial 21 having a pointer thereon which is rotatable with respect to suitable index marks to provide an indication of the number of circular tracks which have been recorded on disk 3. A more complete discription of this indicator is provided in coopending application Ser. No. 06/722,412 which is a continuation of 06/383,206, now abandoned. Suffice it to say that dial 21 rotates in a step wise manner linked with the magnetic transducer, or head, which advances from one circular track to the next. The indicator provides an indication of that portion of the recording capacity of the disk 3 which has been consumed or, alternatively, that portion of the recording capacity which remains available for further recording.

While the present invention has been particularly shown and described with reference to a plurality of embodiments, it should be readily apparent to those of ordinary skill in the art that various changes and modifications in form and details may be made without departing from the spirit and scope of the invention. For example, converging surfaces or walls 8 may interest. However, such intersection requires a relatively large space which might not be available with the small dimensions of disc 3 and hub 6. Also, the walls in FIG. 4 which extend between each of surfaces or walls 8 and the respective ends of resilient element 9 may be curved or may be formed as discrete segments if desired. It is intended that the appended claims be interpreted as including the foregoing as well as various other changes and modifications.

What is claimed is:

1. A magnetic disk assembly comprising a magnetic disk and a hub member centrally positioned on said magnetic disk having a non-circular opening for receiving a circular drive shaft to rotatably drive said magnetic disk, said hub member including means defining at least two flat, relatively immovable reference surfaces which converge toward each other and which form two respective walls of said opening, and resilient means integral with said means defining the reference surfaces and having a surface which forms a third wall of said opening, said three walls being positioned and dimensioned such that, when a circular drive shaft is received in said opening, said reference surfaces and the surface of said resilient means all tangentially contact said drive shaft and said resilient means acts on the drive shaft in the direction in which said flat reference surfaces converge so as to rotate the disk assembly when said drive shaft rotates.

2. The assembly of claim 1; wherein said resilient means is spaced from each of said two surfaces.

3. The assembly of claim 2; further comprising a fourth wall extending from one of said two respective walls of said opening to said resilient means and a fifth wall extending from the other of said two respective walls of said opening to said resilient means.

4. A magnetic disk assembly comprising a magnetic disk and a hub member centrally positioned on said magnetic disk having a non-circular opening for receiving a circular drive shaft to rotatably drive said magnetic disk, said hub member including means defining at least two flat, relatively immovable reference surfaces which converge toward each other and which form two respective walls of said opening, and resilient means integral with said means defining the reference surfaces and having a surface which forms a third wall of said opening, said three walls being positioned and dimensioned such that, when a circular drive shaft is received in said opening, said reference surfaces and the surface of said resilient means all tangentially contact said drive shaft and said resilient means acts on the drive shaft generally in the direction in which said flat reference surfaces converge so as to rotate the disk assembly when when said drive shaft rotates said resilient means including first and second resilient members extending toward each other with a gap therebetween and each having a surface to tangentially contact said drive shaft when the latter is received in said opening.

5. The assembly of claim 4; wherein said first and second resilient members are positioned adjacent said two reference surfaces, respectively.

6. The assembly of claim 1; wherein said resilient means urges said drive shaft, when the latter is received in said opening, into tangential contact with said two reference surfaces.

7. The assembly of claim 1; wherein said two reference surfaces form an angle such that normals to the tangential contact points of said drive shaft with said reference surfaces intersect at the center of said magnetic disk.

8. The assembly of claim 1; wherein said two reference surfaces are equally radially distant from the center of said magnetic disk.

9. A magnetic disk cartridge comprising a jacket; a magnetic disk rotatably disposed in said jacket; a hub member centrally positioned on said magnetic disk and having a non-circular opening for receiving a circular drive shaft to rotatably drive said magnetic disk; an aperture in said jacket through which said hub member is accessed; said hub member including means defining at least two flat, relatively immovable reference surfaces which converge toward each other and which form two respective walls of said opening and resilient means integral with said means defining the reference surfaces and having a surface which forms a third wall of said opening, said two reference surfaces being equally radially distant from the center of said magnetic disk and said resilient means being positioned with respect to said two reference surfaces such that, when a circular drive shaft is received in said opening, said reference surfaces and the surface of said resilient means all tangentially contact said drive shaft and said resilient means acts on the drive shaft generally in the direction in which said flat reference surfaces converge so as to rotate said hub member and disk when said drive shaft rotates.

10. The magnetic disk cartridge of claim 9; wherein said hub member is unitarily formed of resilient material, and said resilient means includes a chordal element having a surface which forms said third wall and is backed up by an elongated hole, said chordal element being disposed between said non-circular opening of said hub member and said elongated hole.

11. The magnetic disk cartridge of claim 10; wherein said non-circular opening of said hub member is dimensioned such that, when a circular drive shaft is received in said opening, said chordal element flexes away from said two reference surfaces.

12. The magnetic disk cartridge of claim 11; wherein said chordal element is comprised of a pair of legs extending toward each other and separated by a gap.

13. A magnetic disk assembly comprising a magnetic disk and a hub member centrally positioned on said magnetic disk having a drive opening for receiving a circular drive shaft to rotatably drive said magnetic disk, said hub member including means defining a pair of flat reference surfaces which converge toward each other and are relatively immovable for precisely positioning said magnetic disk relative to said drive shaft and a resilient member integral with said means defining the reference surfaces and acting against the drive shaft received in said opening in the direction in which said reference surfaces converge for urging said reference surfaces against said drive shaft.

14. The assembly of claim 13; wherein said hub member is of a molded plastic.

15. The assembly of claim 13; wherein said reference surfaces form two respective walls of said drive opening.

16. The assembly of claim 15; wherein said reference surfaces include an angle such that normals to the tangential contact points of said reference surfaces with the drive shaft received in said drive opening intersect at the center of said magnetic disk.

17. The assembly of claim 15; wherein said reference surfaces are equally radially distant from the center of said magnetic disk.

18. The assembly of claim 13; wherein said resilient member is positioned in opposing relation to an angle included by said reference surfaces.

19. The assembly of claim 18; wherein said resilient member extends chordally across said drive opening.

20. The assembly of claim 18; wherein said resilient member includes at least one leg extending into said drive opening.

21. The assembly of claim 18; wherein said resilient member includes a pair of legs extending toward each other.

* * * * *